United States Patent
Touboul et al.

(10) Patent No.: US 10,291,650 B2
(45) Date of Patent: *May 14, 2019

(54) AUTOMATICALLY GENERATING NETWORK RESOURCE GROUPS AND ASSIGNING CUSTOMIZED DECOY POLICIES THERETO

(71) Applicant: Illusive Networks Ltd., Tel Aviv (IL)

(72) Inventors: Shlomo Touboul, Kfar Chaim (IL); Hanan Levin, Tel Aviv (IL); Stephane Roubach, Herzliya (IL); Assaf Mischari, Petach Tikva (IL); Itai Ben David, Tel Aviv (IL); Itay Avraham, Tel Aviv (IL); Adi Ozer, Shoham (IL); Chen Kazaz, Tel Aviv (IL); Ofer Israeli, Tel Aviv (IL); Olga Vingurt, Shderot (IL); Liad Gareh, Herzliya (IL); Israel Grimberg, Ra'anana (IL); Cobby Cohen, Tel Aviv (IL); Sharon Sultan, Tel Aviv (IL); Matan Kubovsky, Tel Aviv (IL)

(73) Assignee: ILLUSIVE NETWORKS LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,817

(22) Filed: Jul. 5, 2017

(65) Prior Publication Data

US 2017/0310689 A1    Oct. 26, 2017

Related U.S. Application Data

(63) Continuation of application No. 15/175,050, filed on Jun. 7, 2016, now Pat. No. 9,712,547.

(Continued)

(51) Int. Cl.
*H04L 29/06* (2006.01)
*G06F 21/57* (2013.01)
(Continued)

(52) U.S. Cl.
CPC .......... *H04L 63/1491* (2013.01); *G06F 21/55* (2013.01); *G06F 21/554* (2013.01);
(Continued)

(58) Field of Classification Search
CPC . H04L 63/1491; H04L 63/1441; H04L 63/20; H04L 63/102; H04L 63/1416;
(Continued)

(56) References Cited

U.S. PATENT DOCUMENTS

| 6,363,489 | B1 | 3/2002 | Comay et al. |
| 6,618,709 | B1 | 9/2003 | Sneeringer |

(Continued)

FOREIGN PATENT DOCUMENTS

| WO | 2006131124 A1 | 12/2006 |
| WO | 2015001969 A1 | 1/2015 |
| WO | 2015047555 A1 | 4/2015 |

OTHER PUBLICATIONS

Wikipedia, Active Directory, https://en.wikipedia.org/wiki/Active_Directory, Jun. 24, 2015.

(Continued)

*Primary Examiner* — Abu S Sholeman
(74) *Attorney, Agent, or Firm* — Soquel Group I.P Ltd.

(57) ABSTRACT

A cyber security system comprising circuitry of a decoy deployer planting one or more decoy lateral attack vectors in each of a first and a second group of resources within a common enterprise network of resources, the first and second groups of resources having different characteristics in terms of subnets, naming conventions, DNS aliases, listening ports, users and their privileges, and installed applica- (Continued)

tions, wherein a lateral attack vector is an object of a first resource within the network that has a potential to be used by an attacker who discovered the first resource to further discover information regarding a second resource within the network, the second resource being previously undiscovered by the attacker, and wherein the decoy lateral attack vectors in the first group conform to the characteristics of the first group, and the decoy lateral attack vectors in the second group conform to the characteristics of the second group.

4 Claims, 6 Drawing Sheets

Related U.S. Application Data

(60) Provisional application No. 62/172,251, filed on Jun. 8, 2015, provisional application No. 62/172,253, filed on Jun. 8, 2015, provisional application No. 62/172,255, filed on Jun. 8, 2015, provisional application No. 62/172,259, filed on Jun. 8, 2015, provisional application No. 62/172,261, filed on Jun. 8, 2015.

(51) Int. Cl.
  *G06F 21/56* (2013.01)
  *G06F 21/55* (2013.01)
  *G06N 99/00* (2019.01)

(52) U.S. Cl.
  CPC ............ *G06F 21/56* (2013.01); *G06F 21/577* (2013.01); *G06N 99/005* (2013.01); *H04L 63/102* (2013.01); *H04L 63/1416* (2013.01); *H04L 63/1425* (2013.01); *H04L 63/1441* (2013.01); *H04L 63/20* (2013.01); *H04L 29/06904* (2013.01); *H04L 63/10* (2013.01); *H04L 63/1433* (2013.01); *H04L 2463/146* (2013.01)

(58) Field of Classification Search
  CPC ........... H04L 63/1425; H04L 2463/146; H04L 63/1433; H04L 63/10; H04L 29/06904; G06F 21/55; G06F 21/554; G06F 21/577; G06F 21/56; G06N 99/005
  USPC ...................................................... 726/25, 1
  See application file for complete search history.

(56) References Cited

U.S. PATENT DOCUMENTS

| | | |
|---|---|---|
| 7,065,657 B1 | 6/2006 | Moran |
| 7,089,589 B2 | 8/2006 | Chefalas et al. |
| 7,093,291 B2 | 8/2006 | Bailey |
| 7,516,227 B2 | 4/2009 | Cohen |
| 7,574,741 B2 | 8/2009 | Aviani et al. |
| 7,636,944 B2 | 12/2009 | Raikar |
| 7,665,134 B1 | 2/2010 | Hernacki et al. |
| 7,694,339 B2 | 4/2010 | Blake et al. |
| 7,725,937 B1 | 5/2010 | Levy |
| 7,752,664 B1 | 7/2010 | Satish et al. |
| 7,945,953 B1 | 5/2011 | Salinas et al. |
| 8,015,284 B1 | 9/2011 | Isenberg et al. |
| 8,181,249 B2 | 5/2012 | Chow et al. |
| 8,181,250 B2 | 5/2012 | Rafalovich et al. |
| 8,185,954 B2* | 5/2012 | Scales ..................... G06F 21/56 713/154 |
| 8,250,654 B1 | 8/2012 | Kennedy et al. |
| 8,375,447 B2 | 2/2013 | Amoroso et al. |
| 8,499,348 B1 | 7/2013 | Rubin |
| 8,528,091 B2 | 9/2013 | Bowen et al. |
| 8,549,642 B2 | 10/2013 | Lee |
| 8,549,653 B2 | 10/2013 | Shou |
| 8,719,938 B2 | 5/2014 | Chasko et al. |
| 8,739,281 B2 | 5/2014 | Wang et al. |
| 8,739,284 B1 | 5/2014 | Gardner |
| 8,769,684 B2 | 7/2014 | Stolfo et al. |
| 8,819,825 B2 | 8/2014 | Keromytis et al. |
| 8,856,928 B1 | 10/2014 | Rivner et al. |
| 8,925,080 B2 | 12/2014 | Hebert |
| 9,009,829 B2 | 4/2015 | Stolfo et al. |
| 9,043,905 B1 | 5/2015 | Allen et al. |
| 9,124,622 B1 | 9/2015 | Falkowitz et al. |
| 9,152,808 B1 | 10/2015 | Ramalingam et al. |
| 9,240,976 B1 | 1/2016 | Murchison |
| 9,325,728 B1 | 4/2016 | Kennedy et al. |
| 9,356,942 B1 | 5/2016 | Joffe |
| 9,495,188 B1 | 11/2016 | Ettema et al. |
| 2002/0066034 A1 | 5/2002 | Schlossberg et al. |
| 2003/0084349 A1 | 5/2003 | Friedrichs et al. |
| 2003/0145224 A1 | 7/2003 | Bailey |
| 2004/0088581 A1 | 5/2004 | Brawn et al. |
| 2004/0160903 A1 | 8/2004 | Gai et al. |
| 2004/0172557 A1 | 9/2004 | Nakae et al. |
| 2004/0255155 A1 | 12/2004 | Stading |
| 2005/0114711 A1 | 5/2005 | Hesselink et al. |
| 2005/0132206 A1 | 6/2005 | Palliyil et al. |
| 2005/0149480 A1 | 7/2005 | Deshpande |
| 2005/0235360 A1 | 10/2005 | Pearson |
| 2006/0041761 A1 | 2/2006 | Neumann et al. |
| 2006/0101516 A1 | 5/2006 | Sudaharan et al. |
| 2006/0161982 A1 | 7/2006 | Chari et al. |
| 2006/0224677 A1 | 10/2006 | Ishikawa et al. |
| 2006/0242701 A1 | 10/2006 | Black et al. |
| 2007/0028301 A1 | 2/2007 | Shull et al. |
| 2007/0157315 A1 | 7/2007 | Moran |
| 2007/0192853 A1 | 8/2007 | Shraim et al. |
| 2008/0016570 A1 | 1/2008 | Capalik |
| 2008/0086773 A1 | 4/2008 | Tuvell et al. |
| 2008/0155693 A1 | 6/2008 | Mikan et al. |
| 2009/0019547 A1 | 1/2009 | Palliyil et al. |
| 2009/0144827 A1 | 6/2009 | Peinado et al. |
| 2009/0222920 A1 | 9/2009 | Chow et al. |
| 2009/0241101 A1 | 9/2009 | Keromytis et al. |
| 2009/0241196 A1 | 9/2009 | Troyansky et al. |
| 2009/0328216 A1 | 12/2009 | Rafalovich et al. |
| 2010/0058456 A1 | 3/2010 | Jajodia et al. |
| 2010/0071051 A1 | 3/2010 | Choyi et al. |
| 2010/0077483 A1 | 3/2010 | Stolfo et al. |
| 2010/0082513 A1 | 4/2010 | Liu |
| 2010/0251369 A1 | 9/2010 | Grant |
| 2010/0269175 A1 | 10/2010 | Stolfo et al. |
| 2011/0016527 A1 | 1/2011 | Yanovsky et al. |
| 2011/0154494 A1 | 6/2011 | Sundaram et al. |
| 2011/0167494 A1 | 7/2011 | Bowen et al. |
| 2011/0214182 A1 | 9/2011 | Adams et al. |
| 2011/0258705 A1 | 10/2011 | Vestergaard et al. |
| 2011/0302653 A1* | 12/2011 | Frantz ................... G06F 21/552 726/22 |
| 2011/0307705 A1 | 12/2011 | Fielder |
| 2012/0005756 A1 | 1/2012 | Hoefelmeyer et al. |
| 2012/0084866 A1 | 4/2012 | Stolfo |
| 2012/0167208 A1 | 6/2012 | Buford et al. |
| 2012/0210388 A1 | 8/2012 | Kolishchak |
| 2012/0246724 A1 | 9/2012 | Sheymov et al. |
| 2012/0311703 A1 | 12/2012 | Yanovsky et al. |
| 2013/0061055 A1 | 3/2013 | Schibuk |
| 2013/0086691 A1 | 4/2013 | Fielder |
| 2013/0212644 A1 | 8/2013 | Hughes et al. |
| 2013/0227697 A1 | 8/2013 | Zandani |
| 2013/0263226 A1 | 10/2013 | Sudia |
| 2014/0101724 A1 | 4/2014 | Wick et al. |
| 2014/0115706 A1* | 4/2014 | Silva ................... H04L 63/1425 726/23 |
| 2014/0201836 A1 | 7/2014 | Amsler |
| 2014/0208401 A1 | 7/2014 | Balakrishnan et al. |
| 2014/0259095 A1 | 9/2014 | Bryant |
| 2014/0298469 A1 | 10/2014 | Marion et al. |
| 2014/0310770 A1 | 10/2014 | Mahaffey |
| 2014/0337978 A1 | 11/2014 | Keromytis et al. |
| 2014/0359708 A1 | 12/2014 | Schwartz |

(56) References Cited

U.S. PATENT DOCUMENTS

| | | | |
|---|---|---|---|
| 2015/0007326 A1 | 1/2015 | Mooring et al. | |
| 2015/0013006 A1 | 1/2015 | Shulman et al. | |
| 2015/0047032 A1 | 2/2015 | Hannis et al. | |
| 2015/0074750 A1 | 3/2015 | Pearcy et al. | |
| 2015/0074811 A1 | 3/2015 | Capalik | |
| 2015/0096048 A1 | 4/2015 | Zhang et al. | |
| 2015/0128246 A1 | 5/2015 | Feghali et al. | |
| 2015/0264062 A1* | 9/2015 | Hagiwara | G06F 21/56 726/24 |
| 2015/0326587 A1 | 11/2015 | Vissamsetty et al. | |
| 2015/0347759 A1* | 12/2015 | Cabrera | G06F 21/577 726/25 |
| 2016/0019395 A1* | 1/2016 | Ramalingam | G06F 21/62 726/1 |
| 2016/0080414 A1 | 3/2016 | Kolton et al. | |
| 2016/0212167 A1 | 7/2016 | Dotan et al. | |
| 2016/0261608 A1 | 9/2016 | Hu et al. | |
| 2016/0308895 A1 | 10/2016 | Kotler et al. | |
| 2016/0323316 A1 | 11/2016 | Kolton et al. | |
| 2016/0373447 A1 | 12/2016 | Akiyama et al. | |
| 2017/0214701 A1* | 7/2017 | Hasan | H04L 63/1408 |
| 2017/0353475 A1* | 12/2017 | Hutton | G06F 21/56 |

OTHER PUBLICATIONS

Wikpedia, Apple Filing Protocol, https://en.wikipedia.org/wiki/Apple_Filing_Protocol, Aug. 14, 2015.

Wikipedia, DMZ (computing), https://en.wikipedia.org/wiki/DMZ_(computing), Jun. 17, 2015.

Wikipedia, Domain Name System, https://en.wikipedia.org/wiki/Domain_Name_System, Jul. 14, 2015.

Wikipedia, Firewall (computing), https://en.wikipedia.org/wiki/Firewall_(computing), Jul. 14, 2015.

Wikipedia, Honeypot (computing), https://en.wikipedia.org/wiki/Honeypot_(computing), Jun. 21, 2015.

Wikipedia, Kerberos (protocol), https://en.wikipedia.org/wiki/Kerberos_(protocol), Jun. 30, 2015.

Wikipedia, Lightweight Directory Access Protocol, https://en.wikipedia_org/wiki/Lightweight_Directory_Access_Protocol, Aug. 15, 2015.

Wikipedia, LM hash, https://en.wikipedia.org/wiki/LM_hash, Jun. 8, 2015.

Wikpedia, Radius, https://en.wikipedia.org/wiki/RADIUS, Aug. 16, 2015.

Wikipedia, Rainbow table, https://en.wikipedia.org/wiki/Rainbow_table, Jul. 14, 2015.

Wikipedia, Secure Shell, https://en.wikipedia.org/wiki/Honeypot_(computing), Jul. 12, 2015.

Wikipedia, Security Information and Event Management, https://en.wikipedia.org/wiki/Security_information_and_event_management, Jun. 23, 2015.

Wikipedia, Tarpit (networking), https://en.wikipedia.org/wiki/Tarpit_(networking), Jul. 3, 2014.

U.S. Appl. No. 15/004,904, Office Action, dated May 27, 2016, 16 pages.

U.S. Appl. No. 15/004,904, Notice of Allowance, dated Oct. 19, 2016, 13 pages.

U.S. Appl. No. 15/175,048, Notice of Allowance, dated Oct. 13, 2016, 17 pages.

U.S. Appl. No. 15/175,050, Office Action, dated Aug. 19, 2016, 34 pages.

U.S. Appl. No. 15/175,050, Office Action, dated Nov. 30, 2016, 31 pages.

U.S. Appl. No. 15/175,050, Notice of Allowance, dated Mar. 21, 2017, 13 pages.

U.S. Appl. No. 15/175,052, Office Action, dated Feb. 13, 2017, 19 pages.

U.S. Appl. No. 15/175,052, Office Action, dated Jun. 6, 2017, 19 pages.

U.S. Appl. No. 15/175,054, Notice of Allowance, dated Feb. 21, 2017, 13 pages.

U.S. Appl. No. 15/403,194, Office Action, dated Feb. 28, 2017, 13 pages.

U.S. Appl. No. 15/406,731, Notice of Allowance, dated Apr. 20, 2017.

PCT Application No. PCT/IL16/50103, International Search Report and Written Opinion, dated May 26, 2016, 9 pages.

PCT Application No. PCT/IL16/50579, International Search Report and Written Opinion, dated Sep. 30, 2016, 7 pages.

PCT Application No. PCT/IL16/50581, International Search Report and Written Opinion, dated Nov. 29, 2016, 10 pages.

PCT Application No. PCT/IL16/50582, International Search Report and Written Opinion, dated Nov. 16, 2016, 11 pages.

PCT Application No. PCT/IL16/50583, International Search Report and Written Opinion, dated Dec. 8, 2016, 10 pages.

* cited by examiner

AUTOMATICALLY GENERATING NETWORK RESOURCE GROUPS AND ASSIGNING CUSTOMIZED DECOY POLICIES THERETO

CROSS REFERENCES TO RELATED APPLICATIONS

This application is a continuation of U.S. patent application Ser. No. 15/175,050, now U.S. Pat. No. 9,712,547, entitled AUTOMATICALLY GENERATING NETWORK RESOURCE GROUPS AND ASSIGNING CUSTOMIZED DECOY POLICIES THERETO and filed on Jun. 7, 2016 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky. U.S. patent application Ser. No. 15/175,050 is a non-provisional of U.S. Provisional Application No. 62/172,251, entitled SYSTEM AND METHOD FOR CREATION, DEPLOYMENT AND MANAGEMENT OF AUGMENTED ATTACKER MAP, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky, the contents of which are hereby incorporated herein in their entirety.

U.S. patent application Ser. No. 15/175,050 is a non-provisional of U.S. Provisional Application No. 62/172,253, entitled SYSTEM AND METHOD FOR MULTI-LEVEL DECEPTION MANAGEMENT AND DECEPTION SYSTEM FOR MALICIOUS ACTIONS IN A COMPUTER NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky, the contents of which are hereby incorporated herein in their entirety.

U.S. patent application Ser. No. 15/175,050 is a non-provisional of US Provisional Application No. 62/172,255, entitled METHODS AND SYSTEMS TO DETECT, PREDICT AND/OR PREVENT AN ATTACKER'S NEXT ACTION IN A COMPROMISED NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky, the contents of which are hereby incorporated herein in their entirety.

U.S. patent application Ser. No. 15/175,050 is a non-provisional of US Provisional Application No. 62/172,259, entitled MANAGING DYNAMIC DECEPTIVE ENVIRONMENTS, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky, the contents of which are hereby incorporated herein in their entirety.

U.S. patent application Ser. No. 15/175,050 is a non-provisional of U.S. Provisional Application No. 62/172,261, entitled SYSTEMS AND METHODS FOR AUTOMATICALLY GENERATING NETWORK ENTITY GROUPS BASED ON ATTACK PARAMETERS AND/OR ASSIGNMENT OF AUTOMATICALLY GENERATED SECURITY POLICIES, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky, the contents of which are hereby incorporated herein in their entirety.

FIELD OF THE INVENTION

The present invention relates to cyber security, and in particular to computer network surveillance.

BACKGROUND OF THE INVENTION

Reference is made to FIG. 1, which is a simplified diagram of a prior art enterprise network 100 connected to an external internet 10. Network 100 is shown generally with resources including computers 110, servers 120, switches and routers 130, and mobile devices 140 such as smart phones and tablets, for ease of presentation, although it will be appreciated by those skilled in the art that enterprise networks today are generally much more varied and complex and include other devices such as printers, phones and any Internet of Things objects. The various connections shown in FIG. 1 may be direct or indirect, wired or wireless communications, or a combination of wired and wireless connections. Computers 110 and servers 120 may be physical elements or logical elements, or a mix of physical and logical elements. Computers 110 and servers 120 may be physical or virtual machines. Computers 110 and servers 120 may be local, remote or cloud-based elements, or a mix of local, remote and cloud-based elements. Computers 110 may be client workstation computers. Servers 120 may be file transfer protocol (FTP) servers, email servers, structured query language (SQL) servers, secure shell (SSH) servers, and other database and application servers. A corporate information technology (IT) department manages and controls network 100 in order to serve the corporate requirements and meet the corporate needs.

Access to computers 110 and servers 120 in network 100 may optionally be governed by an access governor 150, such as a directory service, that authorizes users to access computers 110 and servers 120 based on "credentials" and other methods of authentication. Access governor 150 may be a name directory, such as ACTIVE DIRECTORY® developed by Microsoft Corporation of Redmond, Wash., for WINDOWS® environments. Background information about ACTIVE DIRECTORY® is available at Wikipedia. Other access governors for WINDOWS and non-WINDOWS environments include inter alia Lightweight Directory Access Protocol (LDAP), Remote Authentication Dial-In User Service (RADIUS), and Apple Filing Protocol (AFP), formerly APPLETALK®, developed by Apple Inc. of Cupertino, Calif. Background information about LDAP, RADIUS and AFP is available at Wikipedia.

Access governor 150 may be one or more local machine access controllers. For networks that do not include an access governor, authentication may be performed by other servers 120. Alternatively, in lieu of access governor 150, resources of network 100 determine their local access rights.

Credentials for accessing computers 110 and servers 120 include inter alia server account credentials such as <address> <username> <password> for an FTP server, a database server, or an SSH server. Credentials for accessing computers 110 and servers 120 also include user login credentials <username> <password>, or <username> <ticket>, where "ticket" is an authentication ticket, such as a ticket for the Kerberos authentication protocol or NTLM hash used by Microsoft Corp., or login credentials via certificates or via another method of authentication. Background information about the Kerberos protocol and LM hashes is available at Wikipedia.

Access governor 150 may maintain a directory of computers 110, servers 120 and their users. Access governor 150 authorizes users and computers, assigns and enforces security policies, and installs and updates software.

Computers 110 may run a local or remote security service, which is an operating system process that verifies users logging in to computers and to other single sign-on systems and to other credential storage systems.

Network 100 may include a security information and event management (SIEM) server 160, which provides realtime analysis of security alerts generated by network hardware and applications. Background information about SIEM is available at Wikipedia.

Network 100 may include a domain name system (DNS) server 170, or such other name service system, for translating domain names to IP addresses. Background information about DNS is available at Wikipedia.

Network 100 may include a firewall 180 located within a gateway between enterprise network 100 and external internet 10. Firewall 180 controls incoming and outgoing traffic for network 100. Background information about firewalls is available at Wikipedia.

One of the most prominent threats that organizations face is a targeted attack; i.e., an individual or group of individuals that attacks the organization for a specific purpose, such as stealing data, using data and systems, modifying data and systems, and sabotaging data and systems. Targeted attacks are carried out in multiple stages, typically including inter alia reconnaissance, penetration, lateral movement and payload. Lateral movement involves orientation, movement and propagation, and includes establishing a foothold within the organization and expanding that foothold to additional systems within the organization.

In order to carry out the lateral movement stage, an attacker, whether a human being who is operating tools within the organization's network, or a tool with "learning" capabilities, learns information about the environment it is operating in, such as network topology, network devices and organization structure, learns "where can I go from my current location" and "how can I go from my current location to another location (privilege required)", learns implemented security solutions, learns applications that he can leverage, and then operates in accordance with that data.

An advanced attacker may use different attack techniques to enter a corporate network and to move laterally within the network in order to obtain his resource goals. The advanced attacker may begin with a workstation, server or any other network entity to start his lateral movement. He uses different methods to enter the network, including inter alia social engineering, existing exploit and/or vulnerability, and a Trojan horse or any other malware allowing him to control a first node or nodes.

Once an attacker has taken control of a first node in a corporate network, he uses different advanced attack techniques for orientation and propagation and discovery of additional ways to reach other network nodes in the corporate network. Attacker movement from node to node is performed via an "attack vector", which is an object discovered by the attacker, including inter alia an object in memory or storage of a first computer that may be used to access or discover a second computer.

Exemplary attack vectors include inter alia credentials of users with escalated privileges, existing share names on different servers and workstations, and details including address and credentials of an FTP server, an email server, a database server or an SSH server. Attack vectors are often available to an attacker because a user did not log off of his workstation, did not log out of an application, or did not clear his cache. E.g., if a user contacted a help desk and gave a help desk administrator remote access to his workstation and if the help desk administrator did not properly log off from the remote access session to the users workstation, then the help desk access credentials may still be stored in the user's local cache and available to the attacker. Similarly, if the user accessed a server, e.g., an FTP server, then the FTP account login parameters may be stored in the user's local cache or profile and available to the attacker.

Attack vectors enable inter alia a move from workstation A→server B based on a shared server host name and its credentials, connection to a different workstation using local admin credentials that reside on a current workstation, and connection to an FTP server using specific access credentials.

Whereas IT "sees" the logical and physical network topology, an attacker that lands on a first network node "sees" attack vectors that depart from that node and move laterally to other nodes. The attacker can move to such nodes and then follow "attack paths" by successively discovering attack vectors from node to node.

When the attacker implements such a discovery process on all nodes in the network, he will be able to "see" all attack vectors of the corporate network and generate a "complete attack map". Before the attacker discovers all attack vectors on network nodes and completes the discovery process, he generates a "current attack map" that is currently available to him.

An objective of the attacker is to discover an attack path that leads him to a target network node. The target may be a bank authorized server that is used by the corporation for ordering bank account transfers of money, it may be an FTP server that updates the image of all corporate points of sale, it may be a server or workstation that stores confidential information such as source code and secret formulas of the corporation, or it may be any other network nodes that are of value to the attacker and are his "attack goal nodes".

When the attacker lands on the first node, but does not know how to reach the attack goal node, he generates a current attack map that leads to the attack goal node.

One method to defend against such attacks, termed "honeypots", is to plant and to monitor bait resources, with the objective that the attacker discover their existence and then consume the bait resources, and to notify an administrator of the malicious activity. Background information about honeypots is available at Wikipedia.

Conventional honeypot systems operate by monitoring access to a supervised element in a computer network, the supervised element being a fake server or a fake service. Access monitoring generates many false alerts, caused by non-malicious access from automatic monitoring systems and by user mistakes. Conventional systems try to mitigate this problem by adding a level of interactivity to the honeypot, and by performing behavioral analysis of suspected malware if it has infected the honeypot itself.

One of the drawbacks with conventional security systems based on attack parameters, is that security policy creation and assignment require manual intervention.

SUMMARY

In distinction to conventional honeypot systems that employ bait resources and react to suspicious interaction with those resources, embodiments of the present invention plant deceptions in the form of decoy attack vectors, as described herein, which proactively lure an attacker to make specific lateral moves within an enterprise network.

Embodiments of the present invention automatically create network entity groups and security policies based on data gathered from organizational network machines and other knowledge bases, including inter alia firewall logs, in addition to data from directory services, including inter alia Active Directory. As such, these embodiments provide automated and more suitable security policy distribution of deceptions over the organization's machines.

There is thus provided in accordance with an embodiment of the present invention a cyber security system to detect attackers within a network of resources, including a network data collector collecting data regarding an enterprise network, the data including network resources and their operating systems, users and their privileges, installed applications, open ports, previous logged on users, browser histories, vault content and shares, from data sources including a directory service, the network resources, knowledge bases including firewall logs, and in/out ports of machines, a learning module analyzing the data collected by the network data collector, determining therefrom groupings of the network resources into at least two groups, and assigning a customized decoy policy to each group of resources, wherein a decoy policy for a group of resources includes one or more decoy attack vectors, and one or more resources in the group in which the one or more decoy attack vectors are to be planted, and wherein an attack vector is an object of a first resource that may be used to access or to discover a second resource, and a decoy deployer planting, for each group of resources, one or more decoy attack vectors in one or more resources in that group, in accordance with the decoy policy for that group.

There is additionally provided in accordance with an embodiment of the present invention a cyber security method for detecting attackers within a network of resources, including collecting data regarding an enterprise network, the data including network resources and their operating systems, users and their privileges, installed applications, open ports, previous logged on users, browser histories, vault content and shares, from data sources including a directory service, the network resources, knowledge bases including firewall logs, and in/out ports of machines, analyzing the data collected by the collecting data, determining groupings of the network resources into at least two groups, assigning a customized decoy policy to each group of resources, wherein a decoy policy for a group of resources comprises one or more decoy attack vectors, and one or more resources in the group in which the one or more decoy attack vectors are to be planted, and wherein an attack vector is an object of a first resource that may be used to access or to discover a second resource, and planting, for each group of resources, one or more decoy attack vectors in one or more resources in that group, in accordance with the decoy policy for that group.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

| Table of elements in the figures | |
|---|---|
| Element | Description |
| 10 | Internet |
| 100 | enterprise network |
| 110 | network computers |
| 120 | network servers |
| 130 | network switches and routers |
| 140 | mobile devices |
| 150 | access governor (optional) |
| 252 | forensic alert module |
| 160 | SIEM server |
| 170 | DNS server |
| 180 | firewall |
| 200 | enterprise network with network surveillance |
| 210 | deception management server |
| 211 | policy manager |
| 212 | deployment module |
| 213 | forensic application |
| 214 | data collector |
| 215 | learning module |
| 220 | database of credential types |
| 230 | policy database |
| 240 | decoy servers |
| 242 | forensic alert module |
| 260 | update server |

Elements numbered in the 1000's are operations of flow charts.

DETAILED DESCRIPTION

In accordance with embodiments of the present invention, systems and methods are provided for dynamically managing decoy policies for an enterprise network, which adapt to changes that occur in the network environment.

Figure 1:
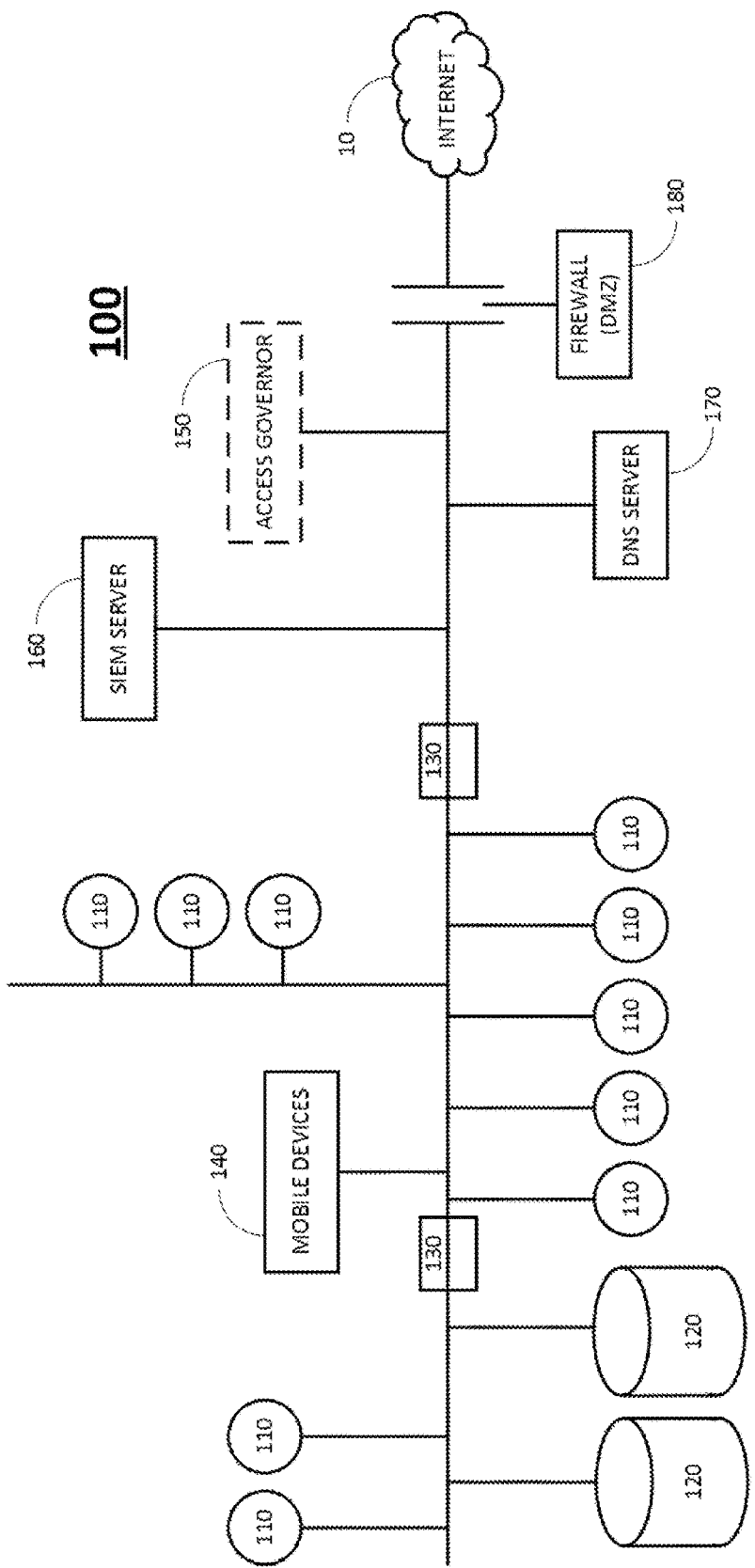
FIG. 1 is a simplified diagram of a prior art enterprise network connected to an external internet.
Figure 2:
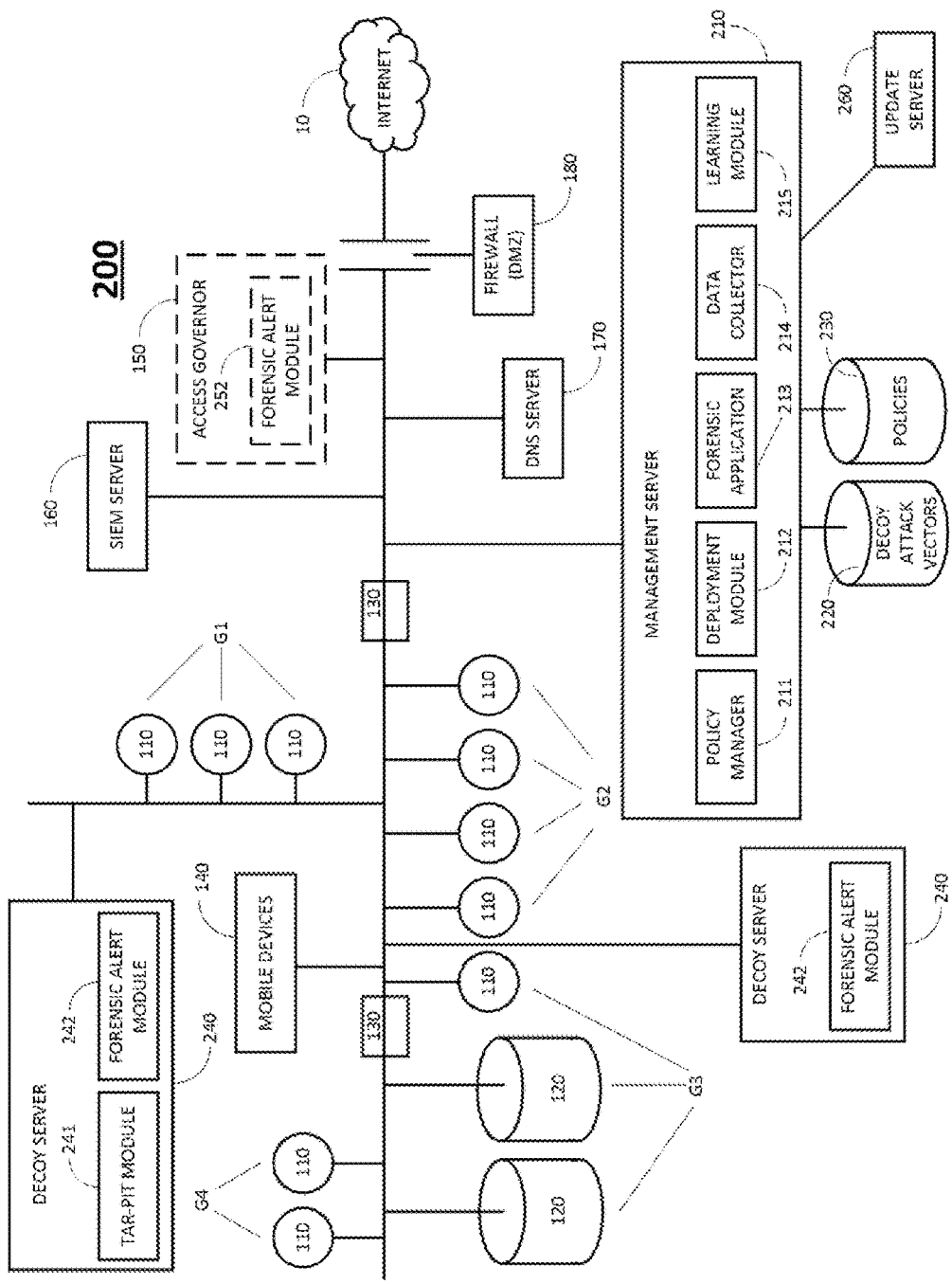
FIG. 2 is a simplified diagram of an enterprise network with network surveillance, in accordance with an embodiment of the present invention.

Reference is made to FIG. 2, which is a simplified diagram of an enterprise network 200 with network surveillance, in accordance with an embodiment of the present invention. Network 200 includes a management server 210, a database 220 of decoy attack vectors, a policy database 230 and decoy servers 240.

Database 220 stores attack vectors that fake movement and access to computers 110, servers 120 and other resources in network 200. Each decoy attack vector in database 220 may point to (i) a real resource that exists within network 200, e.g., an FTP server, (ii) a decoy resource that exists within network 200, e.g., a trap server, or (iii) a resource that does not exist. In the latter case, when an attacker attempts to access a resource that does not exist, access governor 150 recognizes a pointer to a resource that is non-existent. Access governor 150 responds by notifying management server 210, or by re-directing the pointer to a resource that does exist in order to survey the attacker's moves, or both.

Decoy attack vectors proactively lure an attacker to make specific lateral moves within network 200. Attack vectors include inter alia:
user names of the form <username>
user credentials of the form <username> <password>
user credentials of the form <username> <hash of password>
user credentials of the form <username> <ticket>
FTP server addresses of the form <FTP address>
FTP server credentials of the form <FTP address> <username> <password>
SSH server addresses of the form <SSH address>
SSH server credentials of the form <SSH address> <username> <password>
share addresses of the form <SMB address>

The attack vectors stored in database 220 are categorized by families, such as inter alia
F1—user credentials
F2—files
F3—connections
F4—FTP logins
F5—SSH logins
F6—share names
F7—databases
F8—network devices
F9—URLs
F10—Remote Desktop Protocol (RDP)
F11—recent commands
F12—scanners
F13—cookies
F14—cache
F15—Virtual Private Network (VPN)
F16—key logger Credentials for a computer B that reside on a computer A, or even an address pointer to computer B that resides on computer A, provide an attack vector for an attacker from computer A→computer B.

Database 220 communicates with an update server 260, which updates database 220 as new types of attack vectors for accessing, manipulating and hopping to computers evolve over time. Update server 260 may be a separate server, or a part of management server 210.

Policy database 230 stores policies for planting decoy attack vectors in computers of network 200. Each policy specifies decoy attack vectors that are planted on the computers, in accordance with attack vectors stored in database 220. For user credentials, the decoy attack vectors planted on a computer lead to another resource in the network. For attack vectors to access an FTP or other server, the decoy attack vectors planted on a computer lead to a decoy server 240.

It will be appreciated by those skilled in the art the databases 220 and 230 may be combined into a single database, or distributed over multiple databases.

Management server 210 includes a policy manager 211, a deployment module 212, a forensic application 213, a data collector 214 and a learning module 215. Policy manager 211 defines a decoy and response policy. The decoy and response policy defines different decoy types, different decoy combinations, response procedures, notification services, and assignments of policies to specific network nodes, network users, groups of nodes or users or both. Once policies are defined, they are stored in policy database 230 with the defined assignments.

Management server 210 obtains the policies and their assignments from policy database 230, and delivers them to appropriate nodes and groups. It than launches deployment module 212 to plant decoys on end points, servers, applications, routers, switches, relays and other entities in the network. Deployment module 212 plants each decoy, based on its type, in memory (RAM), disk, or in any other data or information storage area, as appropriate. Deployment module 212 plants the decoy attack vectors in such a way that the chances of a valid user accessing the decoy attack vectors are low. Deployment module 212 may or may not stay resident.

Forensic application 213 is a real-time application that is transmitted to a destination computer in the network, when a decoy attack vector is accessed by a computer 110. When forensic application 213 is launched on the destination computer, it identifies a process running within that computer 110 that accessed that decoy attack vector, logs the activities performed by the thus-identified process in a forensic report, and transmits the forensic report to management server 210.

Once an attacker is detected, a "response procedure" is launched. The response procedure includes inter alia various notifications to various addresses, and actions on a decoy server such as launching an investigation process, and isolating, shutting down and re-imaging one or more network nodes. The response procedure collects information available on one or more nodes that may help in identifying the attacker's attack acts, intention and progress.

Each decoy server 240 includes a forensic alert module 242, which alerts management system 210 that an attacker is accessing the decoy server via a computer 110 of the network, and causes management server 210 to send forensic application 213 to the computer that is accessing the decoy server. In an alternative embodiment of the present invention, decoy server 240 may store forensic application 213, in which case decoy server 240 may transmit forensic application 213 directly to the computer that is accessing the decoy server. In another alternative embodiment of the present invention, management server 210 or decoy server 240 may transmit forensic application 213 to a destination computer other than the computer that is accessing the decoy server. Access governor 150 also activates a forensic alert module 252, which alerts management server 210 that an attacker is attempting to use a decoy credential.

Notification servers (not shown) are notified when an attacker uses a decoy. The notification servers may discover this by themselves, or by using information stored on access governor 150 and SIEM 160. The notification servers forward notifications, or results of processing multiple notifications, to create notification time lines or such other analytics.

As shown in FIG. 2, network computers 110 and servers 120 are grouped into groups G1, G2, G3 and G4. Accordingly, policy database 230 stores, for each group of computers, G1, G2, . . . , policies for planting decoy attack vectors in computers of that group. Each policy specifies decoy attack vectors that are planted in each group, in accordance with attack vectors stored in database 220.

Data collector 214 collects data regarding network 200: (i) from access governor 150, the collected data comprising network resources and their operating systems, and users and their privileges, (ii) from the network resources, the collected data comprising installed applications, open ports, previous logged on users, browser histories, vault content and shares, (iii) from knowledge bases comprising firewall logs, the collected data including other network data, and (iv) from in/out ports of machines, the collected data including other network data.

Learning module 215 analyzes the data collected by data collector 214, determines groupings of computers, G1, G2, ..., and assigns a decoy policy to each thus-determined group of computers.

Figure 3:
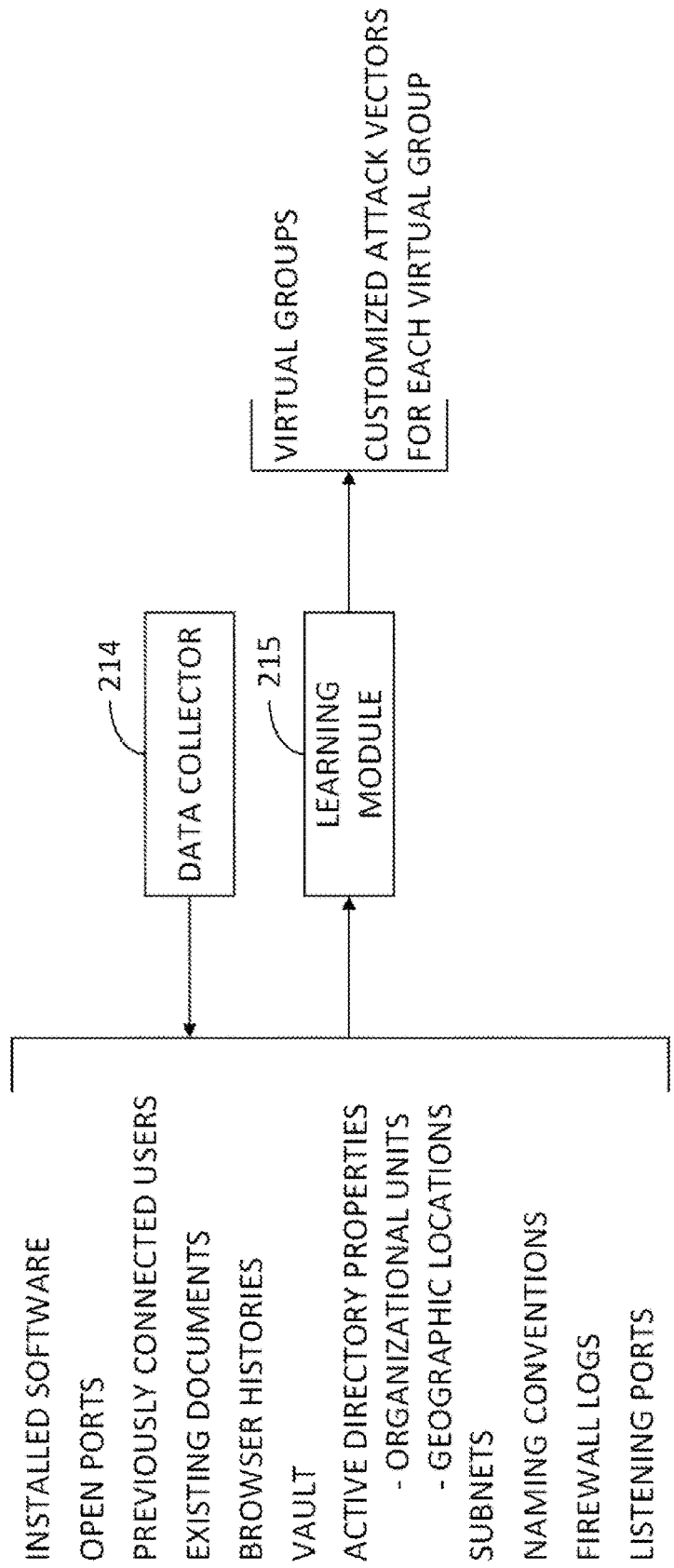
FIG. 3 is a simplified illustration of a data collector and learning module, in accordance with an embodiment of the present invention.

Reference is made to FIG. 3, which is a simplified illustration of data collector 214 and learning module 215, in accordance with an embodiment of the present invention. Data collector 214 analyzes network 200 and collects data including inter alia installed software, open ports, previously connected users, existing documents, browser histories, vault, active directory properties including organization units and their geographic locations, subnets, naming conventions, firewall logs and listening ports.

Learning module 215 analyzes the data collected by data collector 214, and generates virtual groups G1, G2, ..., and customized attack vectors for each virtual group.

Figure 4:
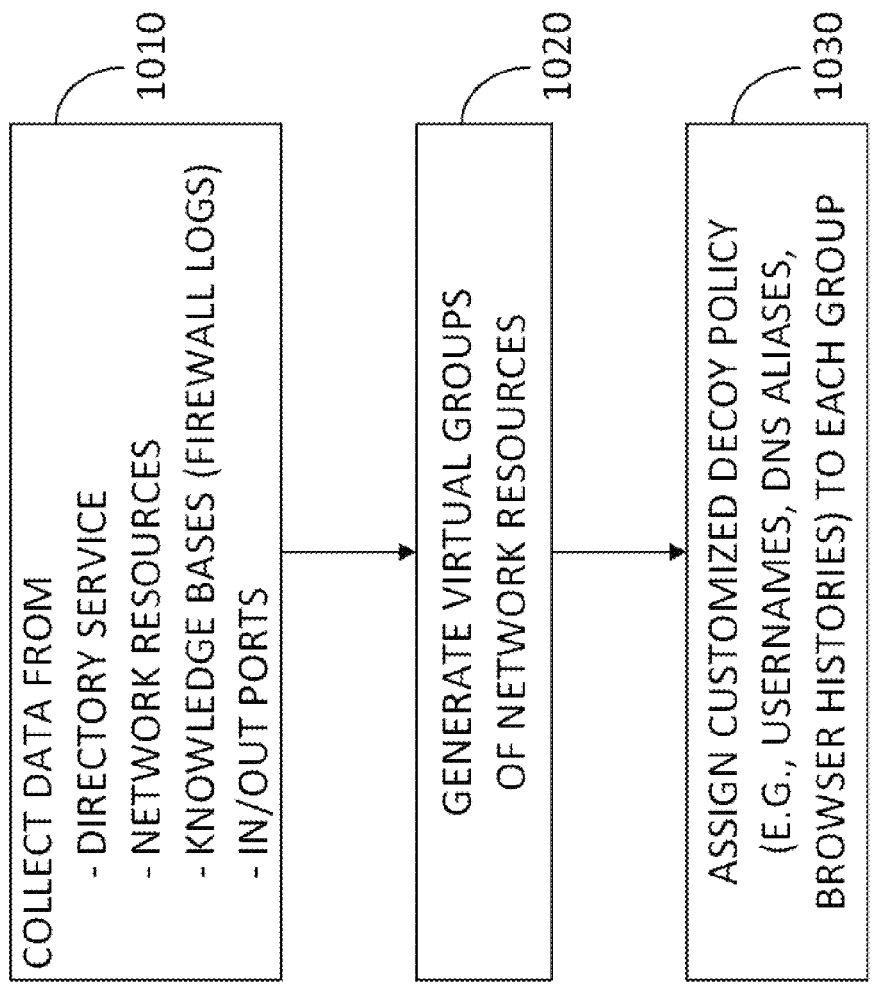
FIG. 4 is a simplified method for grouping network resources and assigning decoy policies to groups, in accordance with an embodiment of the present invention.

Reference is made to FIG. 4, which is a simplified method for grouping network resources and assigning decoy policies to groups, in accordance with an embodiment of the present invention. At operation 1010, data collector 214 collects data about network 200 from a directory service such as access governor 150, from network resources, from knowledge bases including firewall logs and from in/out ports. At operation 1020, learning module 215 generates virtual groups G1, G2, ..., of network resources. At operation 1030, learning module 215 assigns customized decoy policies to each group. The customized decoy policies include inter alia attack vectors with decoy usernames, DNS aliases and browser histories.

Figure 5:
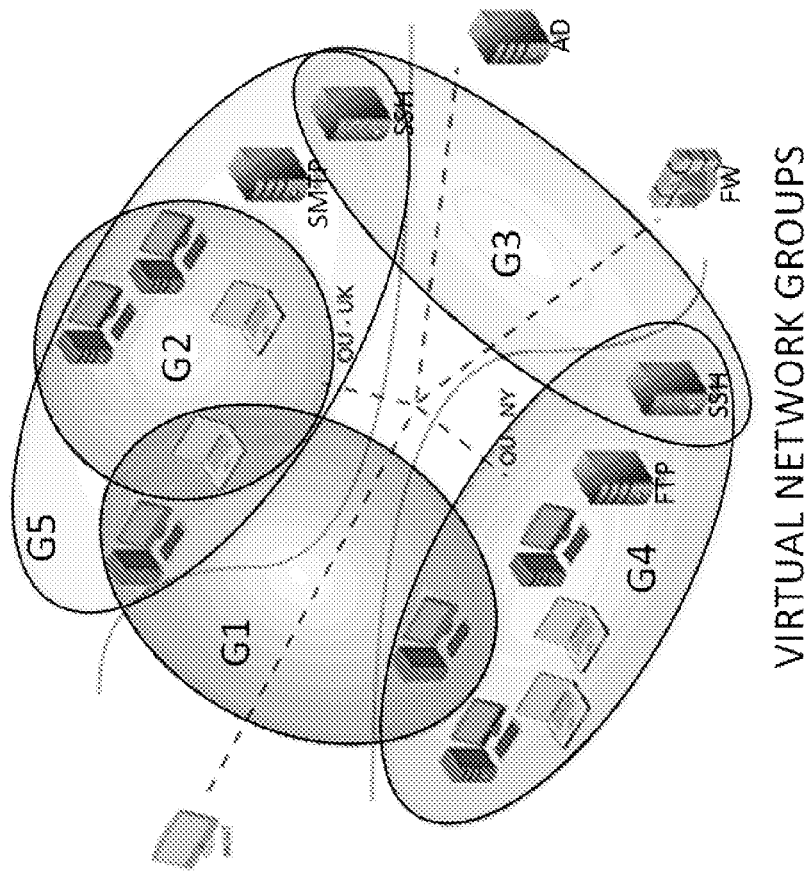
FIG. 5 is a simplified diagram of a virtual grouping of resources in the enterprise network of FIG. 2, in accordance with an embodiment of the present invention.

Reference is made to FIG. 5, which is a simplified diagram of a virtual grouping of the resources of enterprise network 200, in accordance with an embodiment of the present invention. FIG. 5 shows a network having two organizational units, one in New York (NY) and one in the United Kingdom (UK), and a partition of the resources into virtual groups as determined by learning module 215. It is noted that the virtual groups need not necessarily be disjoint, and they may instead overlap. FIG. 5 shows such virtual groups $G_1$, $G_2$, $G_3$, $G_4$, $G_5$ that overlap.

Figure 6:
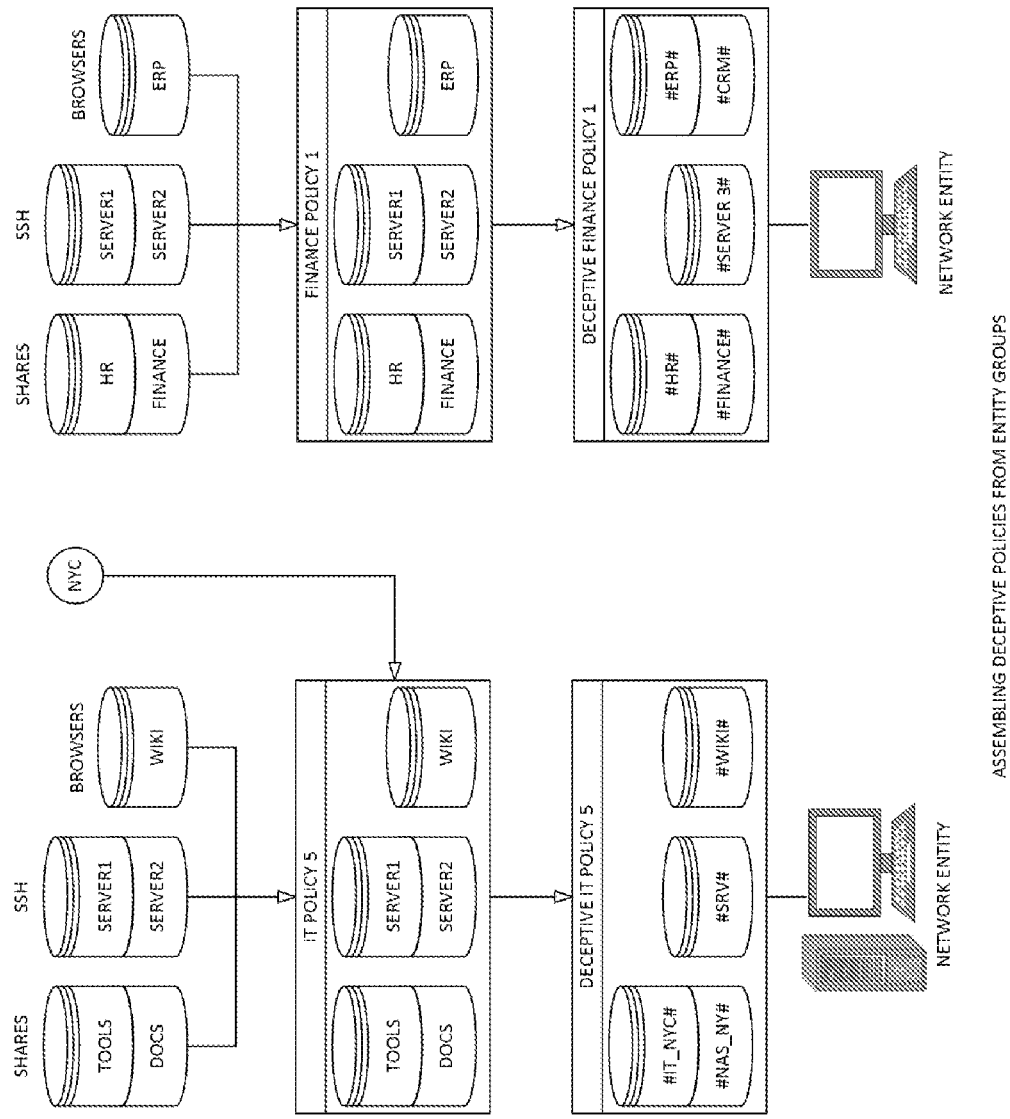
FIG. 6 is a simplified diagram of a system for assembling deception policies for entity groups, in accordance with an embodiment of the present invention.

Reference is made to FIG. 6, which is a simplified diagram of a system for assembling deception policies for entity groups, in accordance with an embodiment of the present invention. FIG. 6 shows a deceptive policy "*Deceptive IT Policy* 5" customized for a group of resources in New York that includes Shares (Tools, Docs), SSH (Server 1, Server 2) and Browsers (Wiki). The deceptive policy includes attack vectors for decoy shares, for a decoy SSH server, and for a decoy browser. FIG. 6 shows another deceptive policy "*Deceptive Finance Policy* 1" customized for a group of resources that includes Shares (HR, Finance), SSH (Server 1, Server 2) and Browsers (ERP). The deceptive policy includes attack vectors for shares, for a decoy SSH server, and for a decoy browsers. Each decoy policy is customized for the virtual group to which it is applied, so that the policy attack vectors appear to be legitimate for that virtual group.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A cyber security system to detect attackers, comprising:

a processor executing instructions stored on a non-transitory computer-readable medium;

circuitry of a decoy deployer, under control of said processor via the instructions, (i) planting one or more decoy lateral attack vectors in each of a first and a second group of real resources within a common enterprise network of resources, the first and second groups of real resources having different characteristics in terms of subnets, naming conventions, DNS aliases, listening ports, users and their privileges, and applications that were installed, wherein a decoy lateral attack vector is a decoy data object of a first resource within the network that has a potential to be used by an attacker who discovered the first resource to further discover information regarding a second resource within the network, the second resource being previously undiscovered by the attacker, (ii) conforming the decoy lateral attack vectors in the first group to the characteristics of the first group, and (iii) conforming the decoy lateral attack vectors in the second group to the characteristics of the second group; and circuitry of a learning module, under control of said processor via the instructions, analyzing characteristics of the common enterprise network of resources, and deriving from the analyzed characteristics the grouping of the resources into the first and second groups.

2. The system of claim 1 further comprising circuitry of a policy manager, under control of said processor via the instructions, assigning a customized decoy policy to each group of resources, wherein a decoy policy for a group of resources comprises one or more decoy lateral attack vectors, and one or more resources in the group in which the one or more decoy lateral attack vectors are to be planted.

3. A cyber security method for detecting attackers, comprising:

planting one or more decoy lateral attack vectors in each of a first and a second group of real resources within a common enterprise network of resources, the first and second groups of real resources having different characteristics in terms of subnets, naming conventions, DNS aliases, listening ports, users and their privileges, and applications that were installed, wherein a decoy lateral attack vector is a decoy data object of a first resource within the network that has a potential to be used by an attacker who discovered the first resource to further discover information regarding a second resource within the network, the second resource being previously undiscovered by the attacker;

conforming the decoy lateral attack vectors in the first group to the characteristics of the first group;

conforming the decoy lateral attack vectors in the second group to the characteristics of the second group;

analyzing characteristics of the common enterprise network of resources; and deriving from said analyzing the grouping of the resources into the first and second groups.

4. The method of claim 3 further comprising assigning a customized decoy policy to each group of resources, wherein a decoy policy for a group of resources comprises one or more decoy lateral attack vectors, and one or more resources in the group in which the one or more decoy lateral attack vectors are to be planted.

\* \* \* \* \*